US005173094A

United States Patent [19]

Brady

[11] Patent Number: 5,173,094

[45] Date of Patent: Dec. 22, 1992

[54] POSITIVE-PRESSURE FILTER ARRANGEMENT FOR HAZARDOUS GASES

[76] Inventor: Timothy S. Brady, P.O. Box 41376, Bakersfield, Calif. 93384-1376

[21] Appl. No.: 693,381

[22] Filed: Apr. 30, 1991

[51] Int. Cl.[5] ........ B01D 47/00

[52] U.S. Cl. ........ 55/233; 55/385.2; 454/187; 423/210

[58] Field of Search ........ 55/233, 97, 385.1, 385.2, 55/467, 473, 482; 423/210; 98/1.5, 115.3, 115.4; 454/187

[56] References Cited

U.S. PATENT DOCUMENTS

| | | | |
|---|---|---|---|
| 4,304,224 | 12/1981 | Fortney | 55/233 |
| 4,774,974 | 10/1988 | Teter | 55/233 |
| 4,804,392 | 2/1989 | Spengler | 55/385.2 |
| 5,004,483 | 4/1991 | Eller et al. | 98/1.5 |

*Primary Examiner*—Bernard Nozick

*Attorney, Agent, or Firm*—Poms, Smith, Lande & Rose

[57] ABSTRACT

A filtration system for removing gaseous and particulate contaminants from a contaminated structure includes a positive pressure source for raising the static pressure within the contaminated structure above an ambient pressure; and a decontamination tunnel which seals around an outlet opening in the contaminated structure. The tunnel contains and channels the contaminates as they exit the contaminated structure. The tunnel includes an outer, gas impermeable skin; removable frames which support the skin; filters which are mounted within the tunnel; and an exhaust duct for channelling filtered air from the tunnel. In a first embodiment, the filters may be wetted with a wetting or neutralizing agent before they are installed within the tunnel; or alternatively, the filters may be dry filters impregnated with dry chemicals that may neutralize or dilute the exhausted contaminates. In a second embodiment, the filters may be continuously wetted with an agent that is pumped from an external source and that runs down over the filters from a channel in the top of the filters' holding frames. In the second embodiment, used wetting agent is drained from the filters and tunnel.

17 Claims, 2 Drawing Sheets

POSITIVE-PRESSURE FILTER ARRANGEMENT FOR HAZARDOUS GASES

FIELD OF THE INVENTION

This invention relates to an arrangement for removing and filtering out hazardous gases and particulate contaminants, particularly from a building, using positive pressure within the building.

BACKGROUND OF THE INVENTION

Fires, tank or pipe leaks, equipment failures, and other accidents often cause the inside of a building to become contaminated with toxic gases. Not only do such toxic gases endanger any workers or residents left inside, but they also hamper the efforts of emergency crews to enter the building and, for example, fight the fire. Moreover, it is usually not desirable simply to blow the gases out of the building, for example using large fans, since one does not wish to contaminate the area surrounding the contaminated building. Ideally, one would like to be able to remove the gases from the building but filter them so that they cannot escape to the atmosphere.

U.S. Pat. No. 3,766,844 (Donnelly et al., Oct. 23, 1973) describes a protective system for a contaminated atmosphere. This arrangement is intended to allow decontamination personnel to carry out decontamination procedures outside of a contaminated atmosphere but before entering a separate, protective shelter. The Donnelly system is both mechanically and electrically complicated, and includes a special pressure control module for preventing loss of pressurized protection when personnel enter and leave the shelter. Because of its complexity and its need for separate air compression, the Donnelly system is not well adapted for ready use with existing fire-fighting procedures.

Another shelter arrangement is described in U.S. Pat. No. 4,682,448 (Healy, Jul. 28, 1987). The shelter shown in this patent extends from an interior floor to a ceiling. A worker may set up a ladder within the Healy shelter and any debris or dust that falls from the ceiling as the worker works is either contained within the walls of the shelter or is vacuumed away by an attached vacuum cleaner. The Healy shelter is neither intended nor suited for eliminating dangerous contaminants from a contaminated building.

A "negative pressure" air filtering device, primarily intended for filtering out free asbestos and harmful industrial dusts, is described in U.S. Pat. No. 4,756,728 (Conrad, Jul. 12, 1988). The Conrad device is essentially a vacuum device, with a large, conical intake nozzle and internal filters. The Conrad device is not designed to work with the positive pressure procedures often used by those fighting fires and toxic contamination.

Positive pressure procedures typically produce much better air flow through the contaminated structure and any attached filtering device. Additionally, it is much easier to channel air using a positive pressure source than a negative pressure source. It is for example easy to aim a fan, but with a vacuum device at the filter outlet, air is sucked through the device without any practical means of directing its flow within the contaminated structure. Furthermore, unless attached filtering devices are rigid, negative pressure applied at their outer end to "suck" air out of a contaminated structure also often leads to collapse of the filtering device. Another example of a negative pressure filtration device is shown in U.S. Pat. No. 4,838,910 (Stollenwerk et al., Jun. 13, 1989).

The object of this invention is to provide a quickly and easily erected positive pressure arrangement for removing gaseous and particulate contaminants from a contaminated structure and for preventing them from escaping into the surrounding atmosphere.

SUMMARY OF THE INVENTION

According to the invention, a filtration system for removing gaseous and particulate contaminants from a contaminated structure includes a positive pressure source for raising the static pressure within the contaminated structure above an ambient pressure; and a decontamination tunnel which seals around an outlet opening in the contaminated structure. The tunnel contains and channels the contaminants as they exit the contaminated structure. The tunnel includes an outer, gas impermeable skin; removable frames which support the skin; filters which are mounted within the tunnel; and an exhaust duct for channelling filtered air from the tunnel.

In a first embodiment, the filters may be wetted with a wetting or neutralizing agent before they are installed within the tunnel; or, alternatively, the filters may be treated with a dry chemical agent before they are installed in the tunnel. In a second embodiment, the filters may be continuously wetted with an agent that is pumped from an external source and that runs down over or flows into the filters from a channel in the top of the filters' holding frames. In the second embodiment, used wetting agent is drained from the filters and tunnel.

DETAILED DESCRIPTION

Figure 1:
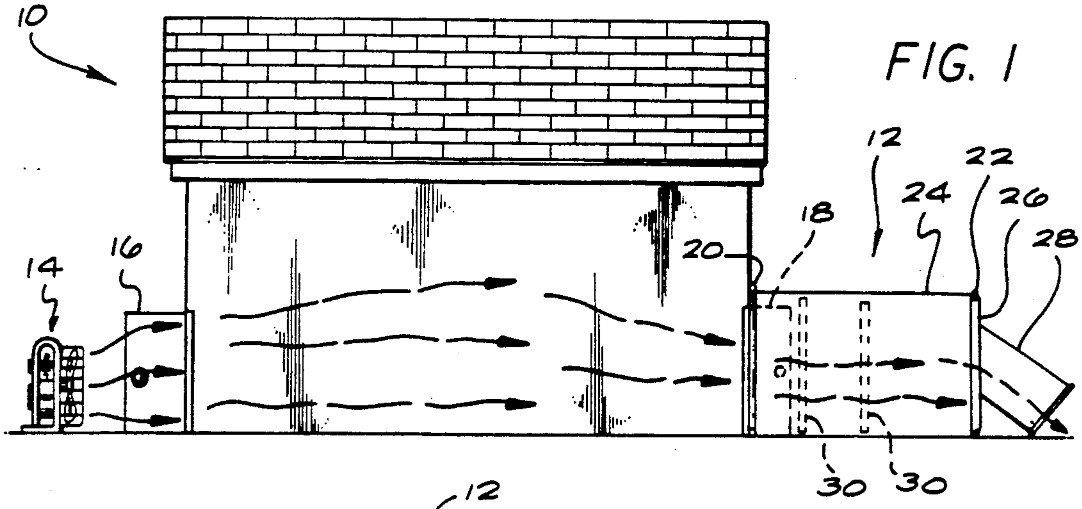
FIG. 1 illustrates the invention generally, and shows the decontamination arrangement according to the invention in use to decontaminate a building.

FIG. 1 illustrates the invention generally in its most advantageous use: decontamination of a mostly enclosed structure 10. The invention includes a decontamination chamber or tunnel 12 and a positive pressure source 14. In the illustrated example, the positive pressure source is a large fan of the type often used by fire or decontamination crews; air compressors or other devices may, however, be used instead of the fan.

The structure 10 has two openings 16, 18. In many cases, these openings will be doors and passageways, preferably on opposite sides of the structure. In certain situations, however, such as when the structure 10 is a warehouse with a single entrance, the entrance may serve as one opening and an opposing window or even a large hole chopped or cut in an opposing wall may serve as the other opening. To the extent it is possible, the only openings in the structure should be those through which a positive pressure device is pumping air or to which a decontamination tunnel is secured; all other openings should be sealed to prevent contaminants from escaping to the surrounding atmosphere.

The tunnel 12 is easily assembled and includes an inner frame 20 and an outer frame 22, which support a bag-like skin 24. The skin of the tunnel is preferably of a durable fabric such as Nylon or Dacron, possibly also LTAB coated. The tunnel includes an outer wall 26, preferably made of the same material as the skin 24, and an exhaust duct 28, which extends from an opening in the outer wall 26. At least one and preferably two or more filters 30 are secured within the tunnel 12 in a manner described below.

When assembled, the decontamination tunnel 12 is thus shaped as a mainly rectangular box that is open only at the inner end and through a small exhaust opening in the outer end. The exhaust duct 28 is preferably made of the same material as the tunnel skin, and may be secured to the outer wall 26 easily using known methods such as sewing, gluing, heat-welding, etc.

In FIG. 1, the flow of air and gas through the structure 10 is shown by arrows. Air is thus pumped into the structure by the fan 14 so that the air pressure within the structure is higher than the ambient air pressure. Air, gases and air-borne particulates in the structure therefore flow toward and through the tunnel 12, through the filters 30, and out through the exhaust duct 28.

In FIG. 1, the exhaust duct 28 is shown as having a mainly rectangular cross section. This is not necessary; rather, the exhaust duct may for example be cylindrical, in which case a coil may be inserted in the duct to reinforce it and keep it from sagging. Reinforcement of the exhaust duct may also be required when the invention is to filter out particulate contaminants. In this case, a rigid shroud (not shown) may also be added as a connecting piece between the tunnel and the exhaust duct.

Figure 2:
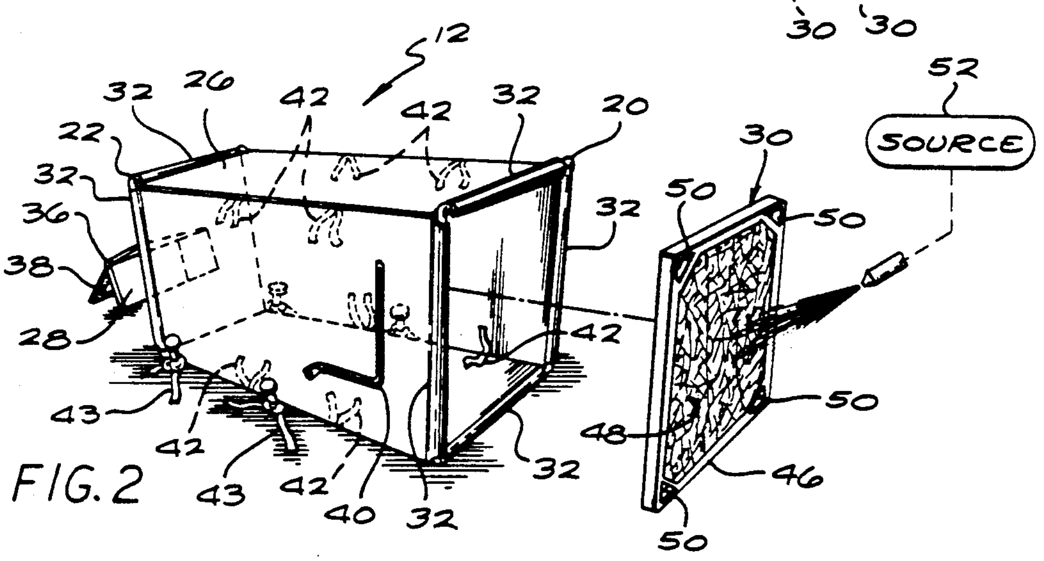
FIG. 2 is a perspective view of a partially disassembled filtering tunnel according to a first embodiment of the invention, along with a filter frame.
Figure 3:
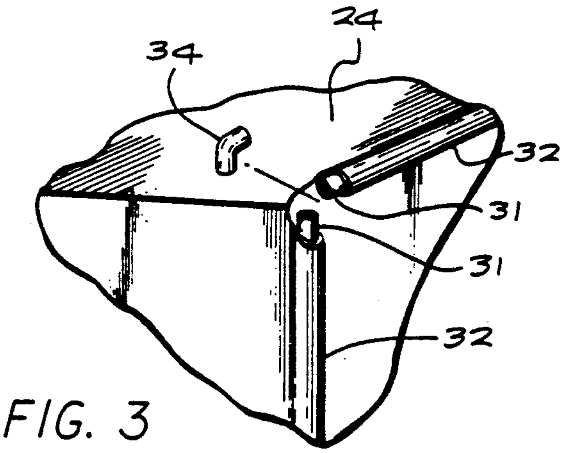
FIG. 3 illustrates a corner joint in a tunnel supporting frame.
Figure 4:
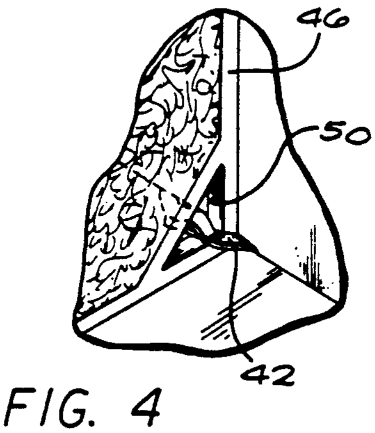
FIG. 4 shows an internal corner connection of a filter screen to the tunnel.

FIGS. 2, 3 and 4 show the tunnel 12 in greater detail. Both the inner and outer frames 20, 22 preferably consist of connected tubing. Straight edge tubes 31 fit into pockets 32 along all four edges at each end of the skin of the tunnel. The edge pockets 32 may be formed simply by sewing, gluing, heat-welding, etc., extending edge flaps of the tunnel skin which are folded back onto themselves or the main portions of the skin. The straight edge tubes 31 are joined at their corners by elbow joints 34.

The straight edge tubes 31 and the elbow joints 34 are preferably made of aluminum conduit tubing, but other study and light-weight materials such as PVC plastic, fiberglass, or other metals, may also be used. The tubing is preferably hollow to reduce weight, but solid rods may also be used as the edge pieces.

The exhaust duct 28 preferably also includes a frame 36 which is formed of tubing in edge pockets, as are the inner and outer tunnel frames 20, 22. A flap or lid with a flap frame 38 is preferably also provided, which can be closed over the outer opening of the exhaust duct 28 to seal it. Flap closure may be arranged in any known manner, such as by using a zipper or Velcro strips around the three unsecured edges of the flap.

A zipper 40 is preferably also installed in one side of the tunnel 12 to form a closeable entrance flap. By unzipping the zipper 40, crew members can enter the tunnel and the contaminated structure without having to remove the tunnel from the contaminated structure. Crew members may thus enter the tunnel to change filters, add chemicals to the filters, or monitor the discharge.

Sets of four fasteners or ties are secured to the lengthwise interior edges of the tunnel. Each set of four is located mainly in a plane parallel to the planes of the frames 20, 22, with each corresponding to one filter 30. In the illustrated example, the fasteners 42 are mating pairs of Velcro strips, although normal ties, snap ties, loops, or other known fasteners may be used. External ties or loops 43 are preferably provided along the lower edges of the tunnel so that the tunnel can be held in place against the ground or floor using common pegs, stakes or weights.

As FIG. 2 shows, each filter 30 is placed in the tunnel 12 such that, when installed, it stands parallel to the frames 20, 22. FIG. 2 illustrates a first embodiment of the filter and filter frame 46. The filter frame holds the actual removable filter material 48, which may be of the fiberglass type, of charcoal impregnated cloth, or of some other known filter material. The filter material is preferably a rectangular pad, which may in turn be made up of a pattern of smaller filter pads connected to one another in any known manner such as plastic snap fasteners.

The first embodiment of the filter frame is preferably made of a durable plastic such as PVC. Having nonmetallic filter frames 46 not only lessens the risk that the frames will tear the tunnel skin when installed, but it also eliminates the need for any electrically conductive or potentially spark-causing parts in the invention. Aluminum or other light metals may, however, also be used for the filter frames. The outer periphery of the filter frame 46 has substantially the same size and shape as the cross section of the tunnel, so that when the filter 30 is in place within the tunnel, the edges of the filter frame form a seal with the inner surface of the tunnel skin. It is not necessary, however, for the frame to form a perfect seal against the tunnel. Since there are preferably at least two filters within the tunnel, gas flow or escape of particles around the first filter will mostly be filtered by the second filter, and any residual will in any event be captured within the tunnel.

An opening 50 is formed in each corner of the filter frame 46. To install the filter 30, it is placed within the tunnel so that each corner opening is adjacent to one of the fasteners or ties 42. As FIG. 4 shows, the filter is then held in place by either tying or, in the case of Velcro strips, joining the ties through the openings 50 in the corners of the filter frame. The filters 30 may thus be installed and removed quickly from the tunnel.

In order to neutralize contaminants, the filter material 48 may be wetted with known neutralizing agents. For example, in the case where the contaminant in the structure is an acidic gas, the filter material may be wetted with an alkaline neutralizing agent. Alternatively, a combined acid/base wetting agent may be used to neutralize base/acid compound gaseous contaminants. In the first embodiment of the filter, shown in FIG. 2, the filter must be wetted externally, before installing it into the tunnel. As FIG. 2 shows, this may be done easily and quickly by spraying the filter material carefully from pre-filled source 52 of the chosen neutralizing agent.

Figure 5:
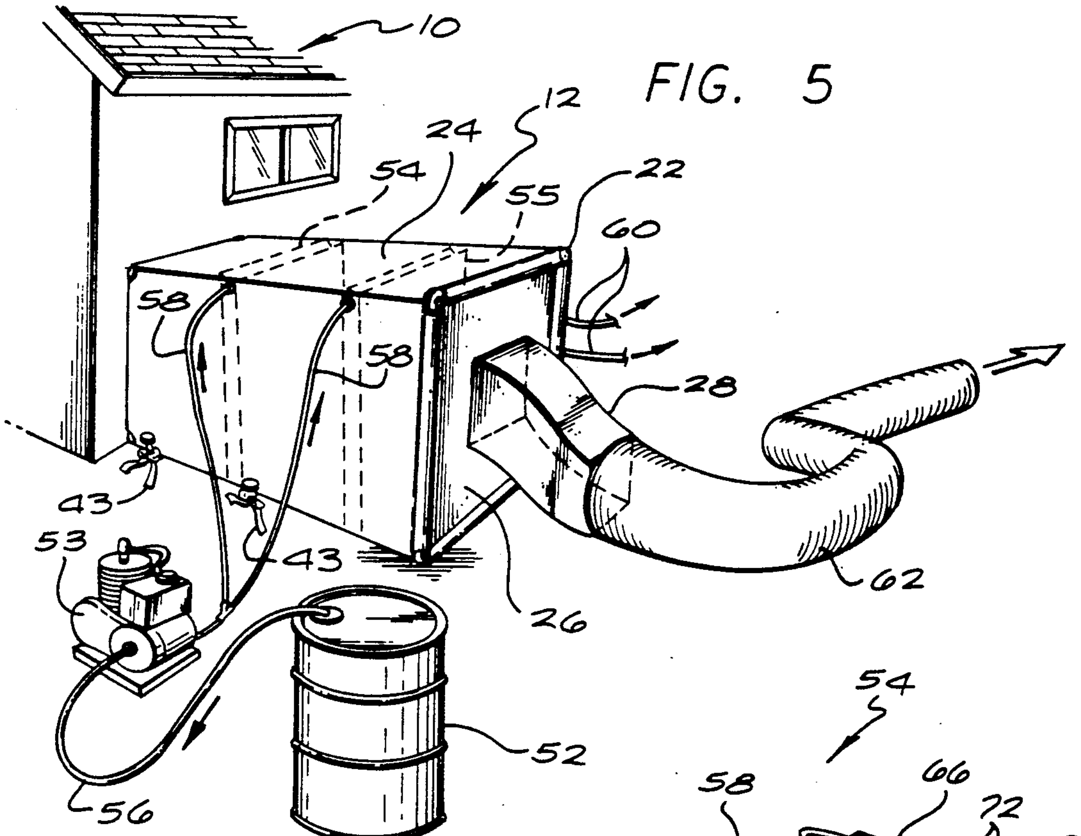
FIG. 5 illustrates an arrangement according to a second embodiment of the invention for wetting decontamination filters within the tunnel.
Figure 6:
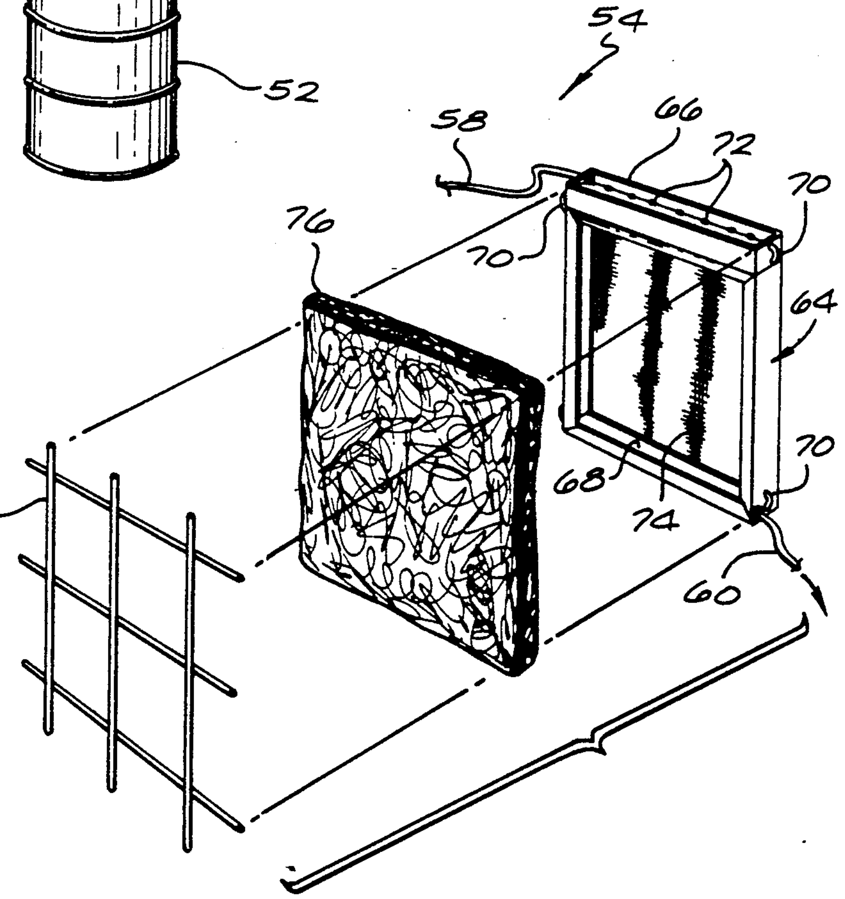
FIG. 6 is an exploded view of the second embodiment of a filter, frame and screen according to the invention.

FIGS. 5 and 6 illustrate a second embodiment of the invention, in which the filters can be wetted and drained while installed within the decontamination tunnel 12. In FIG. 5, structures and parts that are the same or substantially the same as those described above retain the reference numerals used in FIGS. 1–4.

In the illustrated second embodiment, the source of the neutralizing or wetting agent is a drum 52 or other container. The wetting agent is pumped by a pump 53 to filters 54 and 55 mounted within the tunnel 12 via feeder tubes 56, 58. The wetting agent is dripped onto the filters in a manner that is described below, and is drained off via drainage tubes 60 to a suitable receptacle (not shown). Suitable holes, preferably reinforced, are provided in the tunnel skin so that the feeder tubes and drainage tubes may be run to and from the filters 54, 55. These access holes need be no larger than the diameter of the respective tubes, so that there will be little or no leakage of contaminated gas through the holes; the risk of leakage is further reduced by the fact that the filter frames (described below) are preferably in contact with the tunnel skin on either side of the access holes.

An extension duct 62 is optionally connected to the exhaust duct 28 to lead filtered air either to additional filter stages, including water baths and bubble chambers, if necessary, or away from the immediate area. Alternatively, the outer end of the extension duct 62 may be connected to a vacuum type power blower in those instances in which a positive pressure source at the opposite side of the contaminated structure is either unavailable or, for some reason, unwanted. Although this invention thus may be used with negative as well as positive pressure sources, certain modifications may be necessary in order to use negative pressure; for example, a reinforcing coil or assembly may be necessary within the exhaust duct in order to prevent it from collapsing under the force created by the vacuum.

FIG. 6 shows an exploded view of the second embodiment of the filter 54 in greater detail. The filter 54 includes a filter frame 64, which in turn includes an upper drip channel 66, an inner holding and drainage channel, and corner attachment points 70 such as loops. The frame 64 is preferably made of durable plastic, such as PVC, although metal or some other material may also be used. The frame may either be manufactured as a single piece, or the drip channel 66 may be manufactured as a separate part that attaches to the rest of the frame, for example, by snapping onto the top of the frame.

Several holes 72 (for clarity, only two of which are marked) are provided along the bottom of the drip channel 66, and one of the feeder tubes 58 opens is attached to and opens into the drip channel 66. One of the drainage tubes 60 is attached to and opens into the lower portion of the drainage channel 68. The drip channel 66 and the drainage channel 68 are provided with conventional fittings for the feeder and drainage tubes.

The filter frame 64 preferably also includes a mesh 74. To assemble the filter 54, a pad 76 of filter material filter is pressed into the holding channel 68 of the frame 64. A retaining screen 78 is then preferably placed over the filter pad 76 to hold it in place in the frame 64. Alternatively, the retaining screen, together with the frame, may be used to hold in place several smaller filter pads rather than a single pad which is approximately as large as the frame.

When the filter pad 76 and screen 78 are securely in place in the frame 64, the filter is placed within the tunnel as was described above. The ties or loops (see FIG. 4) are rove through the loops 70 on the frame 64, one of the feeder tubes 58 is attached to the drip channel 66 through an access hole in the tunnel skin, and the drainage tube 70 is attached to the drainage channel 68 through another access hole in the tunnel skin.

With the tunnel 12 securely attached over the door or opening in the contaminated structure, a wetting agent (either a neutral agent such as water or some neutralizing agent) is pumped from the source 52 to the drip channel 66 of each filter. The wetting agent will then drip through the holes 72 and over the filter pad 76. This keeps the pad moist with fresh wetting agent. As the wetting agent drains downward over the filter pad 76, it collects in the drainage channel 68 and is drained off through the drainage tube 60, through which it is led to some receptacle (not shown).

Since the illustrated embodiment of the tunnel needs compression (and external power) only to deliver the wetting agent to the drip channels, with gravity seeing to it that the filters are wetted and drained, the reliability of the invention is greatly increased. The compressor 53 may, moreover, be eliminated entirely by raising the source 52 above the level of the tunnel, for example, by placing the drum on a platform, on the bed of a truck, etc., so that the system would be completely gravity fed. This alternative arrangement is particularly advantageous where explosive or flammable gases are being removed from the contaminated structure, such that the electrical activity or heat of the compressor would pose a danger.

In a specific embodiment of the invention, the decontamination tunnel is divided into two chambers. This structure may be visualized by considering FIG. 5. In this case, the section between the treatment element 54 and the structure 10 is a heat chamber and the section of the tunnel to the right of this element 54 is a filter chamber including the filter or treatment element 55. In this embodiment, the heat chamber is of metal, and the treatment element is a heating frame 54 that is mounted at the indicated position in FIG. 5 or at the inner end of the tunnel, that is, immediately adjacent to the opening of the contaminated structure 10. The heating frame 54, which is of metal tubing, includes ports or holes which are directed toward the centerline of the chamber. Propane gas is piped to the heating frame via conventional tubing and, when lit, forms a "ring of fire" around the contaminants as they escape from the contaminated structure. The contaminants are then heated or burned before they enter the filter chamber, which includes filter 55; many toxic gases and particulate contaminants will therefore be significantly neutralized by the heat before reaching the filters.

In an actual prototype of the first embodiment of the invention, the tunnel was made of LTAB coated Dacron and was 20 feet long, seven feet high and eight feet wide. The exhaust duct was rectangular, 15 feet long, two feet high and three feet wide, with an end flap secured with Velcro. The flap frame was made of ⅜ inch PVC tubing. The filter frames were made of one-half inch aluminum conduit tubing with 90° L-couplings. The filter frame held a four-by-four pattern of fiberglass filter pads, which were held together by means of plastic snap fasteners. Two filters were used.

One of the great advantages of this invention is that the tunnel and its supporting frames are easy to assemble and take apart. Furthermore, since the invention, especially the first embodiment shown in FIG. 2, is made of light-weight materials such as Dacron, Nylon, aluminum, PVC plastic, and fiberglass, the invention is much easier to store and to transport than existing filtration systems. Once the frames 20, 22 are quickly taken apart and removed from their respective pockets 32, the tunnel skin may be folded up.

Although the tunnels described above have a rectangular cross section, they may be shaped differently. For example, using hoop-like frames, the tunnels could be substantially cylindrical. The tunnel could also have another polygonal cross section such as triangular; the tunnel skin, pockets and frames could thereby be easily reconfigured.

In the description above of the invention, several alternatives have been mentioned as to both the preferred structures and materials used in the tunnel, the frames, the fasteners, the filters, the neutralizing or wetting agents, etc. All of these variations are encompassed by the following claims and form part of this invention.

I claim:

1. A filtration and neutralization system for removing particulates and contaminants from a contaminated structure, with the contaminated structure having an outlet opening and with the system including:

a) a fan forming positive pressure means for raising the pressure within the contaminated structure above an ambient pressure; and b) substantially rectangular channel means, with an outer end wall, for creating a seal around the outlet opening and for containing and channeling the particulates and contaminants as they exit the contaminated structure, with the channel means having an internal cross-sectional shape and including:

i) an outer skin;

ii) removable support means for supporting the skin, including a separable, sectioned frame formed of tubing and connecting corner joints;

iii) filter means, located within the skin, for filtering out the particulates and neutralizing the contaminants from the air within the channel means, with the filter means including a filter pad and a filter frame that substantially conforms to the internal cross-sectional shape of the channel means and substantially seals against the outer skin;

iv) exhaust means for channelling from the channel means air from which the particulates have been filtered and in which the contaminants have been neutralized, comprising a closable opening in the outer end wall, and including a cowling having an outer frame for holding the cowling open and a flap which closes over the closable opening;

v) securing means for holding the removable support means in the channel means, including pockets in the outer skin for substantially containing the frame tubing at either end of the channel means;

vi) attachment means for rapid installation and removal of the filter means within the outer skin; and vii) neutralizing means, including a source of a neutralization agent, for applying the neutralizing agent to the filter pad.

2. A filtration and neutralization system for removing particulates and contaminants from a contaminated structure, with the contaminated structure having an outlet opening and with the system including:

a) positive pressure means for raising the pressure within the contaminated structure above an ambient pressure; and b) channel means for creating a seal around the outlet opening and for containing and channeling the particulates and contaminants as they exit the contaminated structure, with the channel means including:

i) an outer skin;

ii) removable support means for supporting the skin;

iii) filter means, located within the skin, for substantially sealing against the interior of the skin and for filtering out the particulates and neutralizing the contaminants from the air within the channel means; and iv) exhaust means for channelling from the channel means air from which the particulates have been filtered and in which the contaminants have been neutralized.

3. A filtration and neutralization system as defined in claim 2, in which the structure has an inlet opening and in which the positive pressure means is a fan for blowing air into the structure through the inlet opening.

4. A filtration and neutralization system as defined in claim 2, in which the channel means has an outer end wall, in which the exhaust means comprises a closable opening in the outer end wall, and in which the exhaust means includes a cowling having an outer frame for holding the cowling open and a flat which closes cover the closable opening.

5. A filtration and neutralization system as defined in claim 2, further including a treatment element, and supply means for supplying a treatment agent to the treatment element to react with and substantially neutralize the contaminants.

6. A filtration and neutralization system as defined in claim 2, in which the channel means includes securing means for holding the removable support means in the channel means.

7. A filtration and neutralization system as defined in claim 6, in which the removable support means includes a separable, sectioned frame formed of tubing and connecting corner joints.

8. A filtration and neutralization system as defined in claim 7, in which the securing means comprises pockets in the outer skin for substantially containing the frame tubing at either end of the channel means.

9. A filtration and neutralization system as defined in claim 2, in which the channel means, when assembled, is substantially rectangular.

10. A filtration and neutralization system as defined in claim 9, in which the filter means includes a filter pad and a filter frame.

11. A filtration and neutralization system as defined in claim 10, in which the filter means includes at least two filter frames and corresponding filter pads.

12. A filtration and neutralization system as defined in claim 10, further including attachment means for rapid installation and removal of the filter means within the outer skin.

13. A filtration and neutralization system as defined in claim 12, in which the attachment means includes strips attached to the interior of the outer skin, and openings at the corners of the frame through which the strips extend and are secured to one another.

14. A filtration and neutralization system as defined in claim 10, further including neutralizing means, including a source of a neutralizing agent for chemically neutralizing gaseous and vaporous contaminants removed from the structure, for applying the neutralizing agent to the filter pad.

15. A filtration and neutralization system as defined in claim 14, in which the neutralizing means includes:

a) a drip channel at the top of the filter frame;

b) delivery means for applying the neutralizing agent to the drip channel; and c) drainage means for removing used neutralizing agent from the filter pad.

16. A filtration and neutralization system as defined in claim 15, in which the drip channel includes a plurality of holes, located above the filter pad, through which the neutralizing agent runs down over the filter pad under the force of gravity.

17. A filtration and neutralization system as defined in claim 15, in which the drainage means comprises a drainage channel at the bottom of the filter frame and removal means for removing used neutralizing agent from the drainage channel to outside the outer skin.

* * * * *